UNITED STATES PATENT OFFICE.

JOHN GREIVES, OF PATERSON, NEW JERSEY.

ELECTRICAL INSULATING MATERIAL.

SPECIFICATION forming part of Letters Patent No. 291,718, dated January 8, 1884.

Application filed August 15, 1883. (No specimens.)

*To all whom it may concern:*

Be it known that I, JOHN GREIVES, a citizen of the United States, residing in Paterson, Passaic county, New Jersey, have invented certain new and useful Improvements in Electrical Insulating Materials, fully described in the following specification.

This invention consists in the combination, with colophony or common rosin, of crystalline carbonates of lime reduced to powder and united with the rosin by heat, or the fusion of the latter.

It also consists in a modification of the said composition, in which powdered asbestus is combined with the rosin and crystalline lime carbonate, to make the compound lighter and more adhesive and elastic. The material may also be modified as to plasticity by the addition of a fixed or a drying oil in proportions of from one to six per cent. of the latter. The lime ingredient referred to is found in nature as marble, dolomite, heavy spar, and various forms of calcite, and is prepared for use by grinding or attrition to a fine powder, in which state it is rapidly absorbed by melted rosin, so that a greater quantity thereof can be combined with the rosin than of the chalk or cretaceous carbonate already patented to me in combination with rosin. The product is therefore more of a mineral character, and very dense and hard, and resists the passage of electricity in a manner similar to the cretaceous-carbonate composition referred to, so that a film one-hundredth of an inch in thickness will arrest a current of fifteen amperes per second. The composition is prepared by melting the rosin and stirring in the desired proportion of marble or crystalline powder, a mixture of equal parts making a very solid and hard composition when cold, but capable of receiving a moderate degree of plasticity by the addition of an oily ingredient. A fixed or volatile oil may therefore be used, as the composition is intended to retain its plasticity or not, and from one to six per cent. of such oil may be added, as may be found needful to adapt the composition to any special object—as the covering of flexible cables or the lining of battery-cells—where adhesiveness and some ductility are required.

To correct the brittle character of the composition, I also prepare a modification of the same by adding thereto while fused a proportion of asbestus—say ten to twenty per cent. thereof—which greatly increases the tenacity and elasticity of the compound, while it materially lightens the gravity of the same, owing to the low specific gravity of the asbestus. The latter material, though ground to powder, imparts a tenacity, as if woolen fibers were incorporated with the mass, and somewhat increases the adhesive qualities of the compound.

The composition, prepared in any of the methods stated, may be applied to conducting-wires, the lining of cells and conduits, and the insulation of all parts of electrical apparatus.

I do not claim in this application anything claimed in my Patent No. 278,536, issued May 29, 1883, for a composition of chalk and rosin, nor in my application No. 102,650, filed August 2, 1883, for a patent on a material composed of rosin and silicate of magnesia, these several cases all being in reality subdivisions of the application upon which the said Patent No. 278,536 was based, and in which I at one time claimed, broadly, the combination of rosin or colophony with inert alkaline mineral earths. I have, however, in this application restricted myself to the particular combination set forth, and do not claim anything else herein.

Having set forth the crystalline nature of the lime carbonate employed, it can readily be distinguished from the chalk claimed by me in a previous application, and my present application is not therefore for a composition made with carbonate of lime, broadly, but the crystalline carbonate of lime found in nature in the forms referred to. Such crystalline lime carbonate is far more difficult to powder than the chalk heretofore claimed by me, but is not so likely to be adulterated in commerce (owing to its solid form) before grinding, and is equally valuable, in composition with rosin, as an insulating material.

Having thus set forth the nature of my invention, I claim—

1. The insulating material composed of crystalline lime carbonate, as marble, spar, &c., reduced to powder and combined with rosin, by fusion of the latter, substantially as herein set forth.

2. The composition of rosin and crystalline lime carbonate, prepared substantially as described, and modified by the addition of asbestus, substantially in the proportions set forth.

In testimony whereof I have hereunto set my hand in the presence of two subscribing witnesses.

JOHN GREIVES.

Witnesses:
ROBERT I. HOPPER,
JOHN HOPPER.